United States Patent [19]

Fukushima et al.

[11] Patent Number: 5,218,877
[45] Date of Patent: Jun. 15, 1993

[54] CONTINUOUSLY VARIABLE-SPEED DRIVE

[75] Inventors: Hiroshi Fukushima, Yokohama; Hisashi Machida, Maebashi, both of Japan

[73] Assignee: NSK Ltd., Tokyo, Japan

[21] Appl. No.: 764,164

[22] Filed: Sep. 23, 1991

[30] Foreign Application Priority Data

Sep. 26, 1990 [JP] Japan .................. 2-99748[U]

[51] Int. Cl.⁵ ........................................... F16H 15/12
[52] U.S. Cl. ................................................... 476/40
[58] Field of Search .................. 74/199, 200, 201

[56] References Cited

U.S. PATENT DOCUMENTS

| | | | |
|---|---|---|---|
| 768,114 | 8/1904 | Dean | 74/201 |
| 875,962 | 1/1908 | Stanley | 74/201 |
| 1,228,208 | 5/1917 | Hill | 74/201 |
| 3,115,044 | 12/1963 | Andrews | 74/200 |
| 4,928,542 | 5/1990 | Nakano | 74/201 X |
| 5,007,298 | 4/1991 | Machida | 74/199 X |

FOREIGN PATENT DOCUMENTS

| | | | |
|---|---|---|---|
| 77070 | 7/1967 | France | 74/201 |
| 62-71465 | 5/1987 | Japan . | |
| 2-300549 | 12/1990 | Japan . | |

Primary Examiner—Allan D. Herrmann
Attorney, Agent, or Firm—Shapiro and Shapiro

[57] ABSTRACT

An input disc and/or an output disc of a variable-speed drive, as of the toroidal type, has a central boss portion for attachment to a shaft and a radially extending flange portion with an annular concave power-roller engaging surface. An opposite surface of the flange portion is an annular convex surface having a plurality of radial reinforcement ribs formed thereon. In one preferred form, the ribs have upper surfaces which are inclined so that the front edges thereof are lower than the rear edges thereof in a rotational direction of the disc.

13 Claims, 6 Drawing Sheets

CONTINUOUSLY VARIABLE-SPEED DRIVE

BACKGROUND OF THE INVENTION

1. Field of the Invention

The present invention relates to an improvement in a continuously variable-speed drive such as a variable-speed drive of toroidal type used as a transmission of a motor vehicle and the like.

2. Related Background Art

A continuously variable-speed drive as shown in FIGS. 15 and 16 has been investigated such that it could be used as a transmission of a motor vehicle (for example, a motorcycle) having a relatively low engine output (for example, less than 100 HP), or as a transmission of a light vehicle running at a low speed, such as a lawn mower vehicle, snowplow vehicle, electric car, fork lift truck and the like, or as a transmission for rotating auxiliary equipment such as a compressor, generator and the like at an optimum speed regardless of the change in the number of revolutions of an engine thereof.

Such a variable-speed drive of toroidal type is generally designed so that an input disc 2 and an output disc 4 are attached to ends of an input shaft 1 and of an output shaft 3, respectively, and power rollers 6 each having an adjustable inclined angle are disposed between the input disc 2 and the output disc 4 (refer to the Japanese Utility Model Laid-Open No. 62-71465).

Inner surfaces 2a, 4a of the input and output discs 2, 4 which are opposed to each other have concave surfaces each having a toroidal profile, and a peripheral surface 6a of each power roller 6 has a spherical convex surface. The convex peripheral surfaces 6a of the power rollers 6 are abutted against the inner surfaces 2a, 4a of the discs. A pressurizing means 7 such as a loading cam is disposed between the input shaft 1 and the input disc 2, by which the input disc 2 is elastically biased toward the output disc 4.

In the case of the variable-speed drive of toroidal type having the arrangement as mentioned above, as shown in FIG. 15, when displacement shafts 5 of power rollers 6 are inclined so that the peripheral surfaces 6a of the power rollers 6 are abutted against the inner surface 2a of the input disc 2 near an innermost edge thereof and against the inner surface 4a of the output disc 4 near an outermost edge thereof, the reduction in speed can be provided between the input shaft 1 and the output shaft 3. To the contrary, when the displacement shafts 5 of the power rollers 6 are inclined so that the peripheral surfaces 6a of the power rollers 6 are abutted against the inner surface 2a of the input disc 2 near an outermost edge thereof and against the inner surface 4a of the output disc 4 near an innermost edge thereof as shown in FIG. 16, the increase in speed can be provided between the input shaft 1 and the output shaft 3. And, when the displacement shafts 5 are inclined to any condition between those shown in FIGS. 15 and 16, any intermediate speed ratio (between the maximum acceleration and deceleration) can be obtained between the input shaft 1 and the output shaft 3.

FIG. 17 shows a the variablespeed drive of toroidal type having the abovementioned arrangement and function incorporated into a transmission of a light car (more specifically, refer to the Japanese Patent Laid-Open No. 2-300549).

In this arrangement, a rotational drive force transmitted to a gear 8 via a power transmitting mechanism (not shown) and further to a power transmitting shaft 10 via a gear 9 meshed with the gear 8 is transmitted to the input shaft 1 of the variable-speed drive 12 via a clutch device 11. When the clutch device 11 is engaged, the rotational drive force of the power transmitting shaft 10 is transmitted to the output disc 4 via the input shaft 1, the pressurizing means of loading cam type (rollers 13 and cam plate 17), the input disc 2 and the power rollers 6 rotating around the displacement shafts 5. Further, the rotational drive force is outputted via a gear 15 fixedly mounted on an outer peripheral surface of a cylindrical portion 14 integrally formed on an outer surface 4b of the output disc 4 and serving as an output shaft of the transmission, and a gear 16 meshed with the gear 15.

Generally speaking, it is desirable that variable-speed drives such as the above-mentioned variable-speed drive the lightweight. However, in the above-mentioned variable-speed drive, since all of sectional configurations (taken along planes including axes of discs) of the input disc 2 and of the output disc 4 are the same (i.e., do not change in the circumferential direction), in order to ensure the adequate strength of the input and output discs 2,4, the thickness of each disc must be substantial. As a result, the disks are heavy and the construction could not be made as lightweight as would be desirable.

SUMMARY OF THE INVENTION

The present invention aims to provide a continuously variable-speed drive which can eliminate the aforementioned conventional drawbacks, and an object of the present invention is to reduce the weight of an input disc and/or output disc, and accordingly, the weight of the variable-speed drive by improving a sectional configuration of the input disc and/or output disc.

Another object of the present invention is to obtain lightweight discs without changing the fundamental construction and material of the discs and without reducing the strength of the discs.

In order to achieve the above objects, according to the present invention, there is provided a continuously variable-speed drive comprising an input disc including a first boss portion and a first flange portion extending radially outwardly from the first boss portion, and having a first annular concave surface with a part circular section at one side surface of the first flange portion, and attached to an input shaft via the first boss portion for no rotational movement with respect to the input shaft, and rotated by a rotational driving force from the input shaft; an output disc including a second boss portion and a second flange portion extending radially outwardly from the second boss portion, and having a second annular concave surface with a part-circular section similar to that of the first annular concave portion at one side surface of the second flange portion, and attached to the input shaft via the second boss portion for rotational movement with respect to the input shaft, with facing the second concave surface to the first concave surface; and a plurality of power rollers rotatably attached to a plurality of respective displacement shafts disposed with an annular space between the first and second annular concave surfaces in such a manner that angles between the displacement shafts and the input shaft can be adjusted, each of the power rollers having a spherically convex peripheral surface closely contacting the first and second annular concave surfaces. The number of revolutions of the output disc with respect to that of the input disc is changed in a stageless fashion by changing contacting points between the convex surfaces of the power rollers and the annular concave surfaces of the input and output discs by altering the inclined angles of the displacement shafts. Another side surface of the first flange portion of the input disc and-/or the second flange portion of the output disc has an annular convex surface so that thickness of the first and/or second flange portions become relatively small as a whole, and a plurality of radial reinforcement ribs are formed on the annular convex surface equidistantly in a circumferential direction.

With the arrangement as mentioned above, at least one of the input and output discs can easily be made lightweight while keeping the adequate strength thereof, thus making the variable-speed drive lightweight.

BRIEF DESCRIPTION OF THE DRAWINGS

FIG. 1 is an outer elevational view of an input disc, FIG. 2 is a sectional view taken along the line II—II in FIG. 1, and FIG. 3 is a sectional view taken along the line III—III in FIG. 1;

FIG. 11 is an outer elevational view of a right half of an input disc, FIG. 12 is a sectional view taken along the line XII—XII in FIG. 11, and FIG. 13 is a sectional view taken along the line XIII—XIII in FIG. 11;

FIG. 15 is a side view showing a maximum deceleration condition, and FIG. 16 is a side view showing a maximum acceleration condition.

DETAILED DESCRIPTION OF THE PREFERRED EMBODIMENTS

The present invention will now be explained in connection with an embodiment applied to a continuously variable-speed drive of toroidal type, with reference to the accompanying drawings.

The distinctive characteristic of the variable-speed drive of toroidal type resides in the shape of the input disc (or the output disc). Since the other parts of the variable-speed drive are the same as those in the above-mentioned standard construction, the explanation thereof will be omitted, and the input disc (or the output disc) will be mainly explained.

Figure 1:
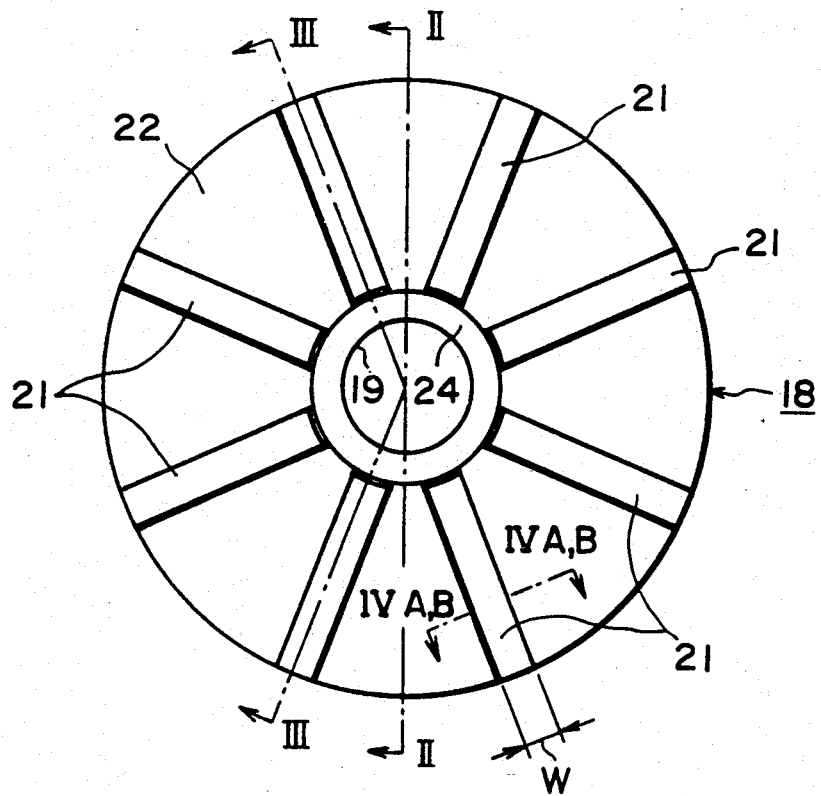
FIGS. 1 to 3 show a preferred embodiment of the present invention where
Figures 2, 3:
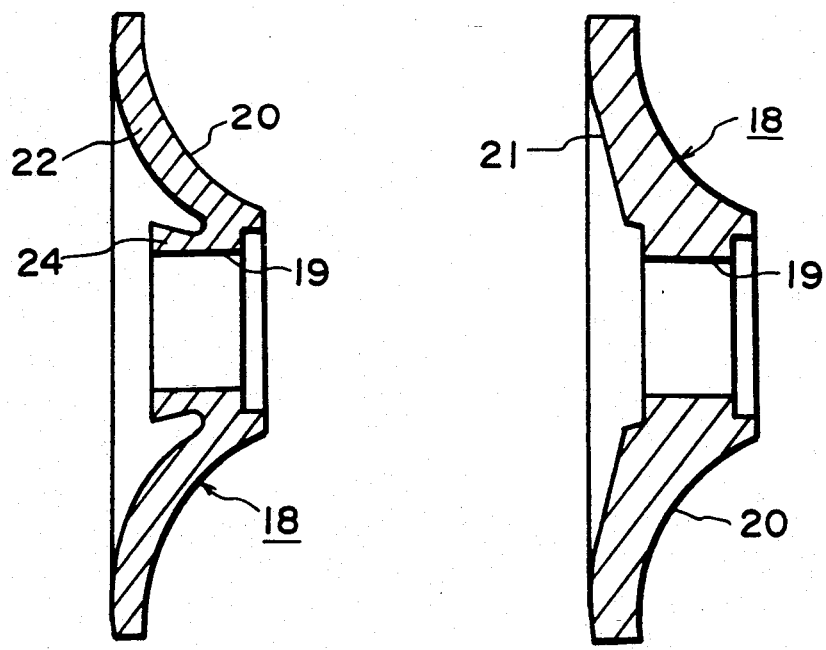
Figure 15:
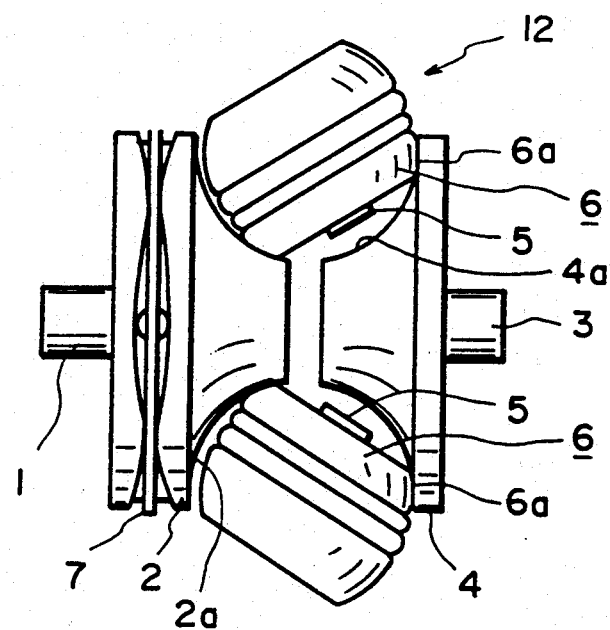
FIGS. 15 and 16 show a standard construction of a variable-speed drive of toroidal type to which the present invention is applicable, where
Figure 16:
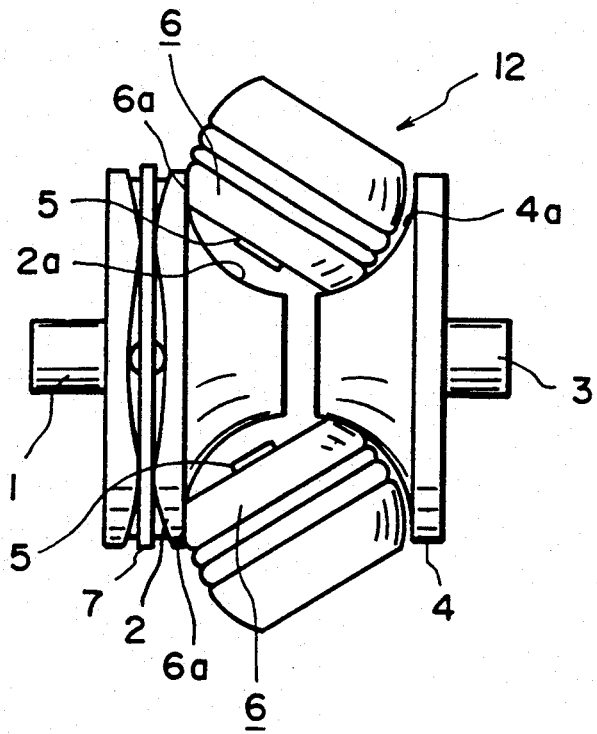
Figure 17:
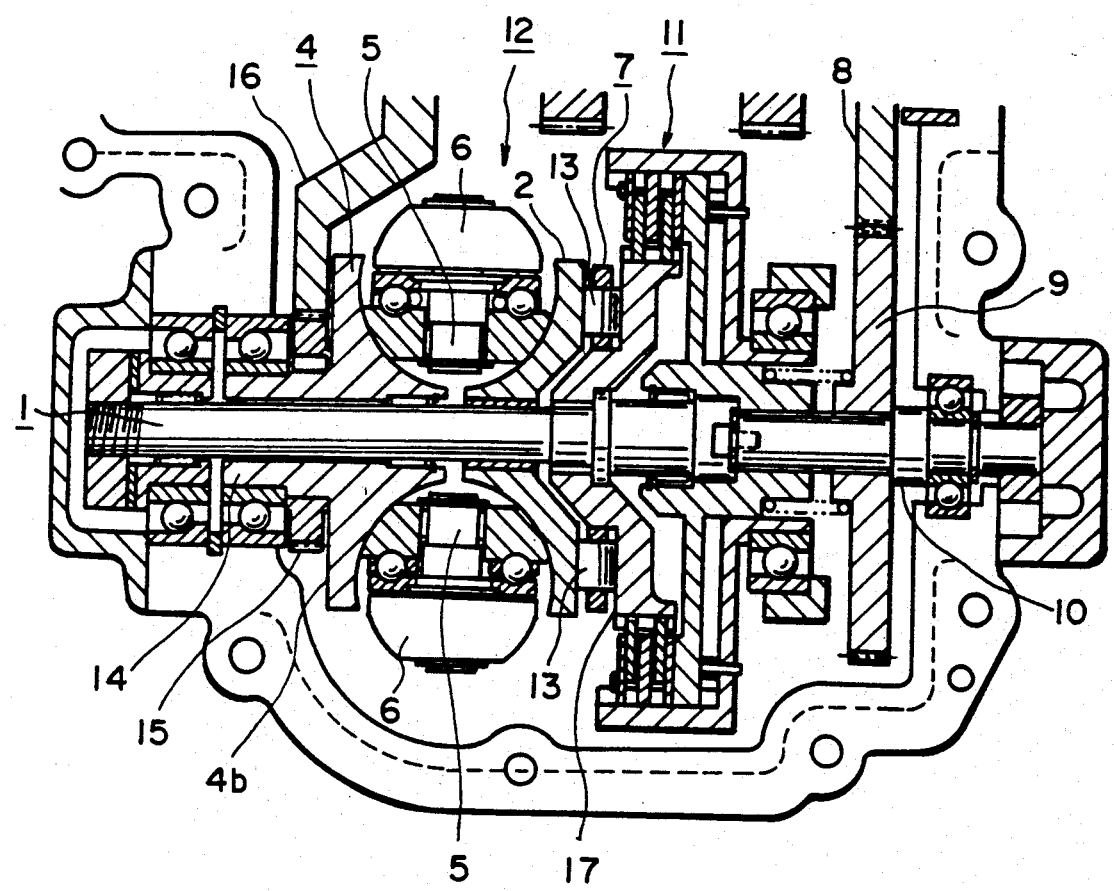
FIG. 17 is a sectional view of a transmission of a vehicle incorporating the variable-speed drive therein.

Referring initially to FIGS. 1 to 3, a circular input disc 18 is provided at its central portion with a relatively short axial boss 24 including a circular opening 19 for receiving an end of an input shaft 1 (FIGS. 15 to 17). A flange 22 extends from the boss radially outwardly. An inner surface 20 (back surface not seen in FIG. 1, and right side surface in FIGS. 2, 3) of the flange 22 is formed as a concave surface 20 having a toroidal sectional profile.

Figure 4A:
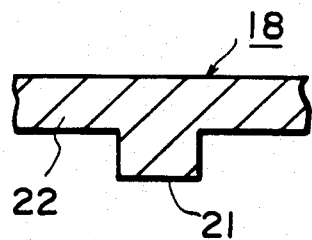
FIGS. 4A and 4B are sectional views taken along the line IVA, B—IVA, B in FIG. 1, showing alternative sectional profiles of a reinforcement rib

An outer surface of the flange 22 is provided with a plurality (eight in the illustrated embodiment) of reinforcement ribs 21 which extend radially and each has a rectangular cross-section as shown in FIG. 4A. In addition, the outer surface of the flange 22 including no reinforcement rib is so formed that it has a convex surface defining a toroidal sectional profile having the same center of curvature as that of the inner concave surface 20, as shown in FIG. 2, thus reducing a thickness of the flange 22.

In this way, since a plurality of reinforcement ribs 21 are formed on the outer surface of the flange 22 and at the same time the outer surface of the flange 22 is formed as convex surface having the toroidal sectional profile to reduce the thickness of the flange, it is possible to reduce the weight of input disc 18 without reducing the strength thereof, thus making the whole variable-speed drive of toroidal type correspondingly lighter.

Figure 4B:
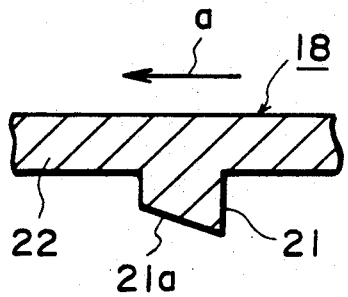

While the cross-section of each reinforcement rib 21 may be rectangular as mentioned above, an outer end surface 21a of each reinforcement rib can be inclined, as shown in FIG. 4B, so that a front edge of the end surface in the rotational direction of the input disc 18 (left edge in FIG. 4B when the input disc is rotated from the right to the left as shown by the arrow a) is lower than a rear edge.

By inclining the outer end surface 21a of each reinforcement rib 21 in this way, it is possible to reduce the resistance to the rotation of the input disc 18 having the reinforcement ribs 21. In more detail, when input disc 18 is mounted within a housing of the transmission as shown in FIG. 17 (input disc designated by the reference numeral 2) and lubricant oil exists in the housing, the input disc 18 is rotated within the lubricant oil. Thus, when the reinforcement ribs 21 are shifted (rotated) within the lubricant oil, it is preferable that the shape of each reinforcement rib present a low resistance to the lubricant oil in view of the fact that the loss of the transmitted power of the variable-speed drive of toroidal type can be reduced. This may be achieved using the shape shown in FIG. 4B. Of course the cross-sectional shape of each reinforcement rib 21 may be semi-circular or the like, other than that shown in FIG. 4B.

Figure 5:
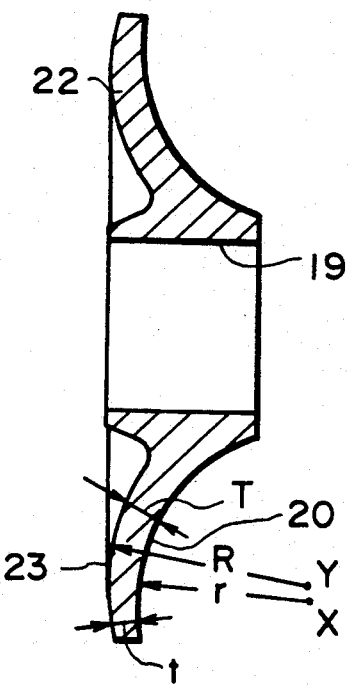
FIG. 5 is a sectional view of an input disc showing a concave portion having no reinforcement rib.

Further, although the thickness of the flange 22 having no reinforcement rib 21 may be uniform between its outer periphery and its inner periphery as mentioned above, when the thickness of the flange is gradually decreased from its inner periphery to its outer periphery as shown in FIG. 5, it is possible to further reduce the weight of the input disc without decreasing the rigidity of the flange 22.

In the cross-sectional shape of the flange 22 shown in FIG. 5, the sectional profile of the inner concave surface 20 of the input disc is defined by a circle having a radius of r with its center X, and the sectional profile of the outer convex surface 23 is defined by a circle having a radius of R ($>$r) with its center Y nearer than X with respect to the center of the input disc. As a result, the thickness t of the flange 22 in the vicinity of its outer periphery will be smaller than the thickness T in the vicinity of the inner periphery (T>t). The sectional profile of the outer surface 23 need not necessarily be defined by the single circle, but may be defined, for example, by a plurality of circles having different radii.

Figure 6:
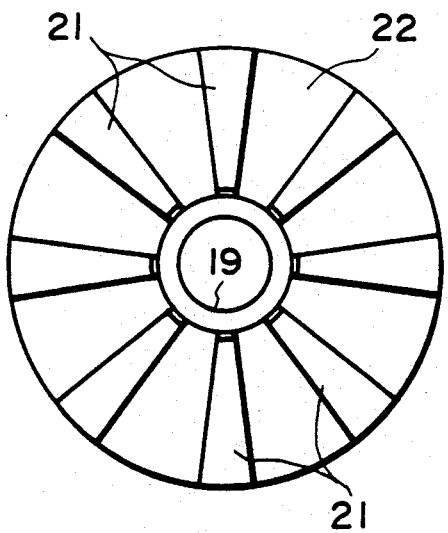
FIGS. 6 to 8 are outer elevational views of input discs showing examples of non-preferable arrangements of reinforcement ribs.

A width W of each reinforcement rib 21 (FIG. 1) is preferably uniform in the radial direction. If each reinforcement rib 21 has a variable width gradually increasing toward outward and thereof as shown in FIG. 6, since the resulting structure will not reduce the weight of the input disc effectively in comparison with the improvement in the rigidity of the disc. Thus, the reinforcement ribs of FIG. 6 are not preferable in comparison with those of FIG. 1.

Figure 7:
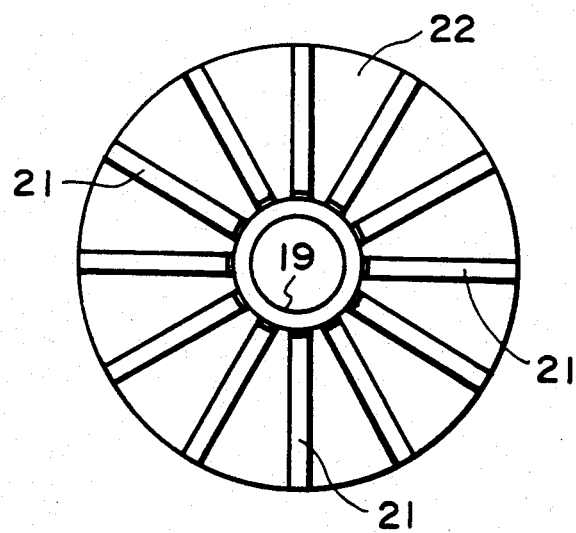
Figure 8:
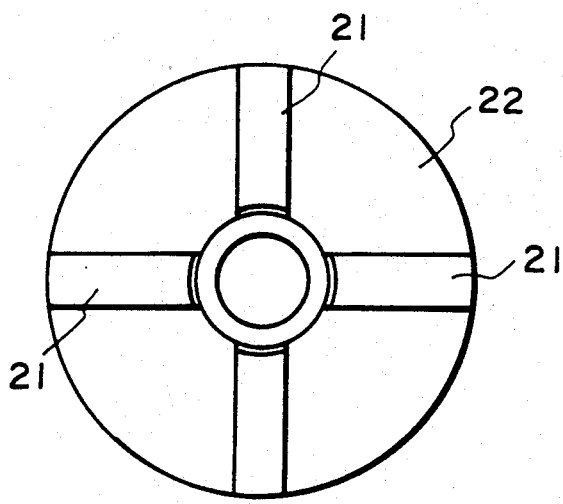

Further, the number of the reinforcement ribs 21 formed on the outer side surface of the input disc 18 is not limited to a specific value so long as it is plural; but, it is preferable that the number of the ribs is of the order of 6-10. It is referable that the number of the reinforcement ribs 21 formed on the input disc not be too great (twelve) as shown in FIG. 7 or too small (four) as shown in FIG. 8. The inventor has found, from a test, that, if the whole weight of the input disc is kept constant, when the number of the reinforcement ribs 21 was in the order of 6-10, the disc could be easily manufactured and has a relatively great rigidity.

Figure 9:
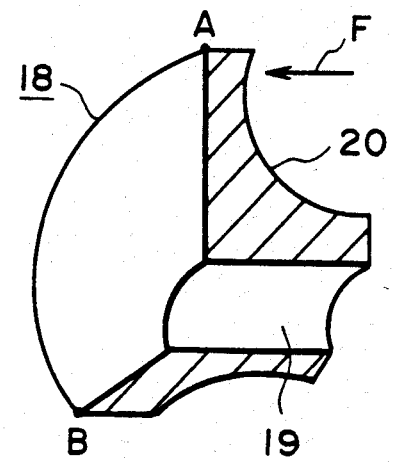
FIG. 9 is a sectional perspective view of a portion of the input disc showing a load acting point and a measuring point in a test ascertaining the effect of the present invention.
Figure 10:
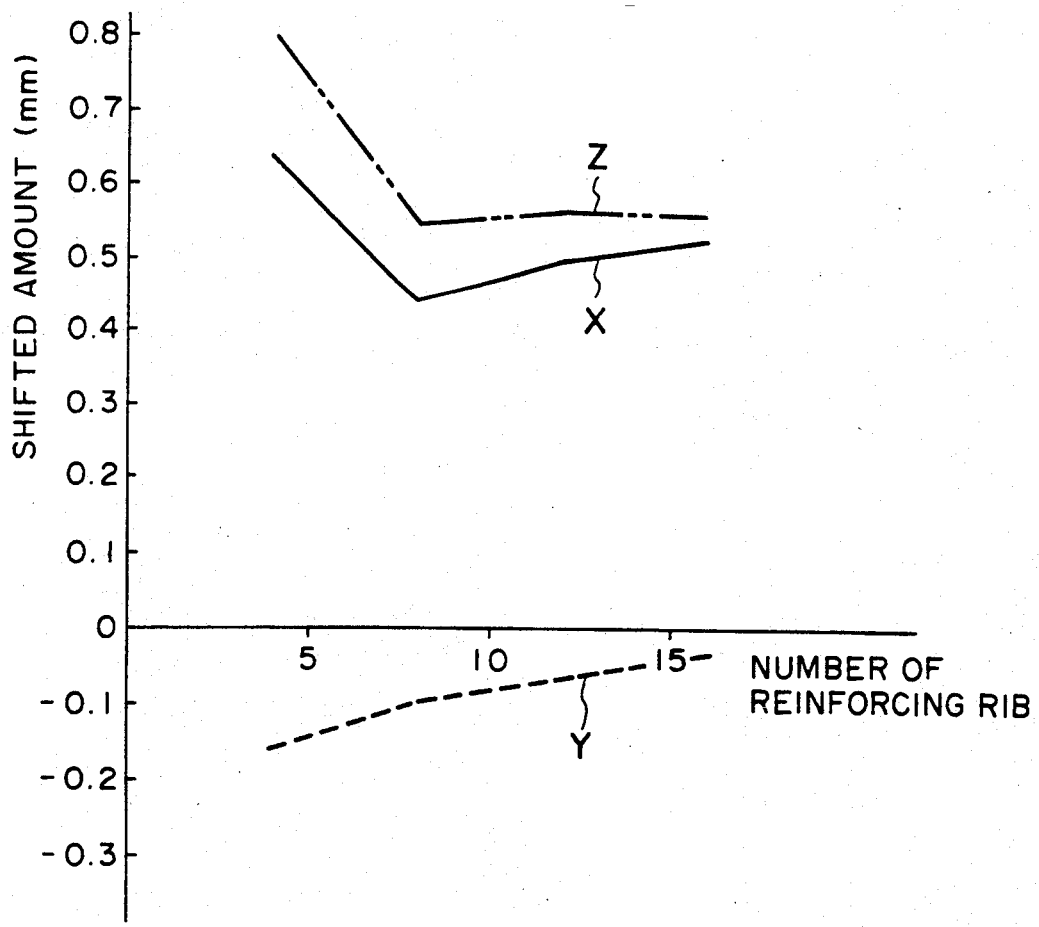
FIG. 10 is a graph showing a result of the above test.

More particularly, the inventor carried out the following test. A plurality of different input discs 18 having the same weights and different numbers of the reinforcement ribs 21 were prepared, and as shown in FIG. 9, for each of the input discs, when the same load F was applied to a point A on an outer periphery of the outer surface of the input disc 18, the displacement of the point A and the displacement of a point B deviated from the point A by 90 degrees in a circumferential direction were measured. As a result, the displacements (shifted amounts) of the points A and B were varied depending upon the number of reinforcement ribs as shown by the solid line X and the broken line Y in FIG. 10, respectively, and, the difference in displacement between the points A and B was varied as shown by the two-dot and chain line Z in FIG. 10. As apparent from FIG. 10, values on lines X and Z are minimum when the number of the reinforcement ribs is eight, and such values are increased when the rib number is either increased or decreased from eight. In consideration of this test result and the easy manufacture of the input disc, the inventor has judged that the rib number of 6-10 is appropriate.

Further, although the plurality of the reinforcement ribs 21 may be formed on the outer surface of the input disc 18 at equal intervals along the circumferential direction thereof, when the reinforcement ribs are formed on the outer surface with different intervals along the circumferential direction, the input disc 18 is hard to be vibrated as the disc is rotated. For the same reason, the number of the reinforcement ribs 21 formed on the outer surface of the input disc 18 may be differentiated from that of reinforcement ribs formed on an outer surface of the output disc. However, the rotational balance of each disc should be ensured.

Incidentally, in the above explanation, while only the input disc 18 was described, it should be noted that the same arrangement as mentioned above can be applied to the output disc alone, or to both of the output and input discs.

Figure 11:
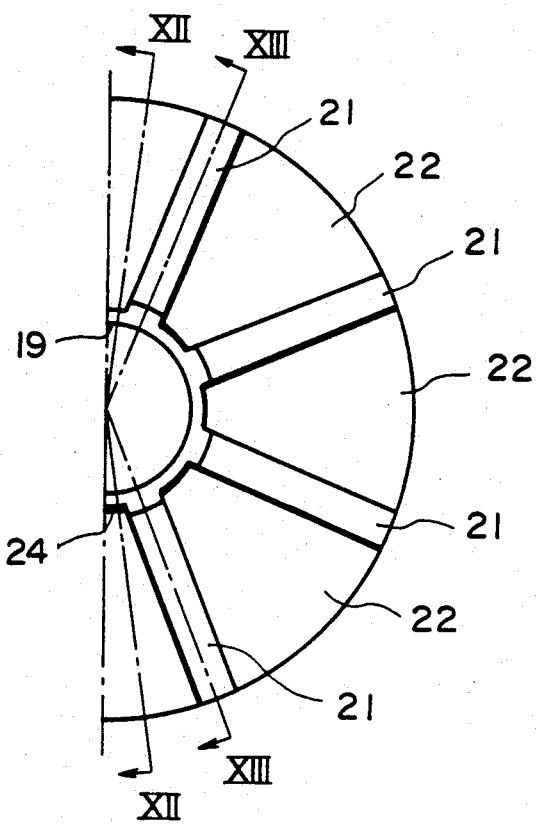
FIGS. 11 to 13 show a second embodiment of the present invention where
Figure 12:
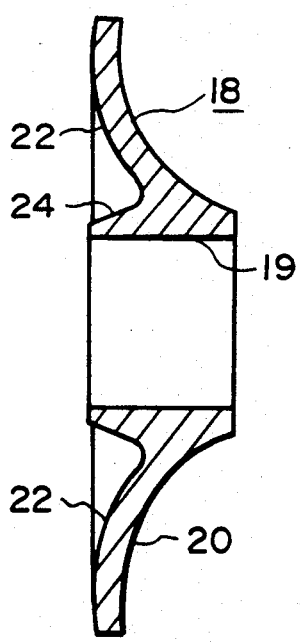
Figure 13:
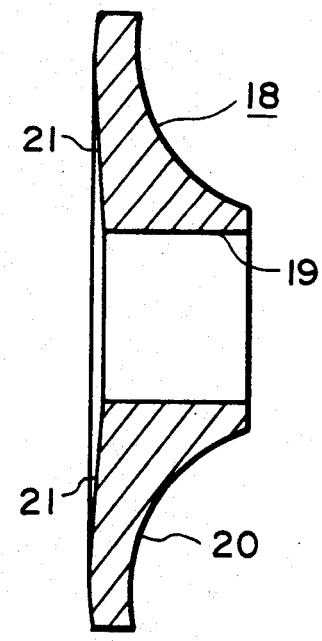

Next, a second embodiment of the present invention is shown in FIGS. 11 to 13.

The second embodiment differs from the aforementioned first embodiment in the point that a shape of the boss 24 formed on the central portion of the input disc 18 and adapted to receive the input shaft 1 (FIGS. 15 to 17) therein differs from that of the previous embodiment. Since the other construction or arrangement is the same as the first embodiment, the same or similar elements are designated by the same reference numerals, and the explanation thereof will be omitted. As apparent from FIGS. 11 and 12, the boss 24 in this second embodiment is lengthened in an axial direction, and one end of the boss is further protruded so that it is flush with the surface of the flange 22.

Figure 14:
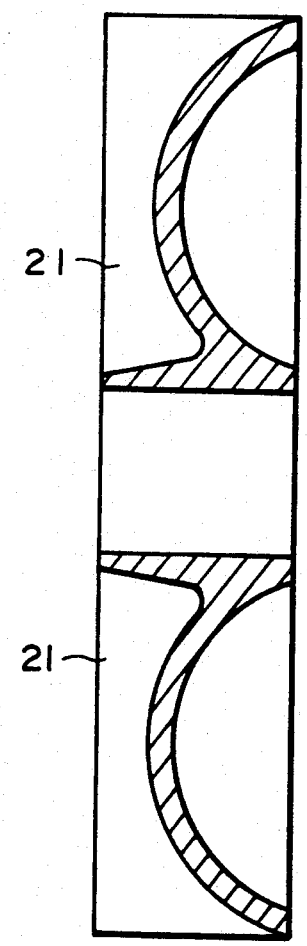
FIG. 14 is a sectional view of an input disc showing a third embodiment of the present invention.

Further, in the above-mentioned first and second embodiments, while the input disc to be incorporated into the variable-speed drive of half toroidal type was explained, the output disc may, of course, have the same construction as that of the input disc as mentioned above. In addition, as for input and output discs to be incorporated into a variable-speed drive of full toroidal type, by forming reinforcement ribs 21 on outer surfaces of the discs as shown in FIG. 14, it is possible to reduce the weights of the discs while maintaining the desired rigidity of each disc. Those skilled in the art will also appreciate that the present invention can be applied to any variable-speed drives, other than the toroidal type.

What is claimed is:

1. A continuously variable speed drive, comprising:
an input disc including a first boss portion and a first flange portion extending radially outwardly from said first boss portion, and having a first annular concave surface of part-circular cross-section at one side surface of said first flange portion, and attached to an input shaft via said first boss portion for no relative rotation with respect to said input shaft, and rotated by a rotational driving force from said input shaft;

an output disc including a second boss portion and a second flange portion extending radially outwardly from said second boss portion, and having a second annular concave surface of part-circular cross-section similar to that of said first annular concave portion at one side surface of said second flange portion, and attached to said input shaft via said second boss portion for relative rotation with respect to said input shaft, with said second concave surface facing said first concave surface; and a plurality of power rollers rotatably attached to respective displacement shafts disposed within a space between said first and second annular concave surfaces in such a manner that angles between said displacement shafts and said input shaft can be adjusted, each of said power rollers having a spherically convex peripheral surface closely contacting said first and second annular concave surfaces;

a number of revolutions of said output disc with respect to a number of revolutions of said input disc being continuously variably changeable by changing contacting points between said convex surfaces of said power rollers and said annular concave surfaces of said input and output discs by altering the angles between said displacement shafts and said input shaft;

wherein at least one of said first flange portion of said input disc and said second flange portion of said output disc has, opposite to its respective said one side surface, an annular concave surface and a plurality of radial reinforcement ribs formed on said annular convex surface at equal intervals in a circumferential direction; and wherein an upper surface of each of said ribs is inclined so that a front edge thereof is lower than a rear edge thereof in a rotational direction of the corresponding disc.

2. A continuously variable speed drive according to claim 1 wherein said annular convex surface is defined by a spherical surface concentric with said annular concave surface of said one flange portion.

3. A continuously variable speed drive according to claim 2, wherein each of said ribs has a uniform width.

4. A continuously variable speed drive according to claim 1, wherein said annular convex surface is configured such that said one flange portion has a gradually decreasing thickness toward a radial outward end thereof.

5. A continuously variable speed drive according to claim 4, wherein each of said ribs has a uniform width.

6. A continuously variable speed drive, comprising:
an input disc including a first boss portion and a first flange portion extending radially outwardly from said first boss portion, and having a first annular concave surface of part-circular cross-section at one side surface of said first flange portion, and attached to an input shaft via said first boss portion for no relative rotation with respect to said input shaft, and rotated by a rotational driving force from said input shaft;
an output disc including a second boss portion and a second flange portion extending radially outwardly from said second boss portion, and having a second annular concave surface of part-circular cross-section similar to that of said first annular concave portion at one side surface of said second flange portion, and attached to said input shaft via said second boss portion for relative rotation with respect to said input shaft, with said second concave surface facing said first concave surface; and
a plurality of power rollers rotatably attached to respective displacement shafts disposed within a space between said first and second annular concave surfaces in such a manner that angles between said displacement shafts and said input shaft can be adjusted, each of said power rollers having a spherically convex peripheral surface closely contacting said first and second annular concave surfaces;
a number of revolutions of said output disc with respect to a number of revolutions of said input disc being continuously variably changeable by changing contacting points between said concave surfaces of said power rollers and said annular convex surfaces of said input and output discs by altering the angles between said displacement shafts and said input shaft;
wherein at least one of said first flange portion of said input disc and said second flange portion of said output disc has, opposite to its respective said one side surface, an annular concave surface and a plurality of radial reinforcement ribs formed on said annular convex surface at equal intervals in a circumferential direction; and
wherein an axial length of said one flange portion, where there is no reinforcement rib, is substantially the same as that of said boss portion of the corresponding disc.

7. A continuously variable speed drive according to claim 6, wherein an upper surface of each of said ribs is inclined so that a front edge thereof is lower than a rear edge thereof in a rotational direction of the corresponding disc.

8. A continuously variable speed drive according to claim 7, wherein said annular convex surface is defined by a spherical surface concentric with said annular concave surface of said one flange portion, and each of said ribs has a uniform width.

9. A continuously variable speed drive according to claim 7, wherein said annular convex surface is configured such that said one flange portion has a gradually decreasing thickness toward a radial outward end thereof, and each of said ribs has a uniform width.

10. A continuously variable speed drive, comprising:
an input disc including a first boss portion and a first flange portion extending radially outwardly from said first boss portion, and having a first annular concave surface of part-circular cross-section at one side surface of said first flange portion, and attached to an input shaft via said first boss portion for no relative rotation with respect to said input shaft, and rotated by a rotational driving force from said input shaft;
an output disc including a second boss portion and a second flange portion extending radially outwardly from said second boss portion, and having a second annular concave surface of part-circular cross-section similar to that of said first annular concave portion at one side surface of said second flange portion, and attached to said input shaft via said second boss portion for relative rotation with respect to said input shaft, with said second concave surface facing said first concave surface; and
a plurality of power rollers rotatably attached to respective displacement shafts disposed within a space between said first and second annular concave surfaces in such a manner that angles between said displacement shafts and said input shaft can be adjusted, each of said power rollers having a spherically convex peripheral surface closely contacting said first and second annular concave surfaces;
a number of revolutions of said output disc with respect to a number of revolutions of said input disc being continuously variably changeable by changing contacting points between said concave surfaces of said power rollers and said annular convex surfaces of said input and output discs by altering the angles between said displacement shafts and said input shaft;
wherein at least one of said first flange portion of said input disc and said second flange portion of said output disc has, opposite to its respective said one side surface, an annular concave surface and a plurality of radial reinforcement ribs formed on said annular convex surface at equal intervals in a circumferential direction; and
wherein an axial length of said one flange portion, where there is no reinforcement rib, is shorter than that of said boss portion of the corresponding disc.

11. A continuously variable speed drive according to claim 10, wherein an upper surface of each of said ribs is inclined so that a front edge thereof is lower than a rear edge thereof in a rotational direction of the corresponding disc.

12. A continuously variable speed drive according to claim 11, wherein said annular convex surface is defined by a spherical surface concentric with said annular concave surface of said one flange portion, and each of said ribs has a uniform width.

13. A continuously variable speed drive according to claim 11, wherein said annular convex surface is configured such that said one flange portion has a gradually decreasing thickness toward a radial outward end thereof, and each of said ribs has a uniform width.

* * * * *